US005780843A

United States Patent [19]
Cliche et al.

[11] Patent Number: 5,780,843
[45] Date of Patent: Jul. 14, 1998

[54] ABSOLUTE OPTICAL FREQUENCY CALIBRATOR FOR A VARIABLE FREQUENCY OPTICAL SOURCE

[75] Inventors: Jean-François Cliche, Charlesbourg; Michel Têtu, Cap-Rouge; Christine Latrasse, Dolbeau, all of Canada

[73] Assignee: Université Laval, Quebec City, Canada

[21] Appl. No.: 680,870

[22] Filed: Jul. 16, 1996

[51] Int. Cl.[6] ............................................. G01J 3/51
[52] U.S. Cl. .................... 250/226; 250/205; 250/339.13; 250/339.09; 372/32
[58] Field of Search .................... 250/226, 205, 250/343, 339.01, 339.06, 339.07, 339.09, 339.13; 372/32, 11; 356/320, 416, 432, 437

[56] References Cited

U.S. PATENT DOCUMENTS

| Re. 35,366 | 10/1996 | Hall ............................................. 372/32 |
|---|---|---|
| 3,609,583 | 9/1971 | Brun. |
| 3,732,017 | 5/1973 | Wolber. |
| 3,742,382 | 6/1973 | Smith. |
| 3,973,849 | 8/1976 | Jackson et al.. |
| 4,081,765 | 3/1978 | Berg et al.. |
| 4,241,997 | 12/1980 | Chraplyvy. |
| 4,284,964 | 8/1981 | Maier, Jr.. |
| 4,410,273 | 10/1983 | Mantz et al.. |
| 4,833,681 | 5/1989 | Akiyama et al.. |
| 4,914,666 | 4/1990 | Glance. |
| 5,023,804 | 6/1991 | Hoult. |
| 5,025,448 | 6/1991 | Sudo et al.. |
| 5,033,114 | 7/1991 | Jayaraman et al.. |
| 5,272,345 | 12/1993 | Durham et al.. |
| 5,448,070 | 9/1995 | Day et al.. |
| 5,450,207 | 9/1995 | Fomenkov. |

Primary Examiner—Edward P. Westin
Assistant Examiner—Kevin Pyo
Attorney, Agent, or Firm—James Anglehart; Swabey Ogilvy Renault

[57] ABSTRACT

Calibration of a variable frequency light source is performed by a control unit which has a knowledge of the known transmission pattern of an optical filter, such as gas cell or a calibrated interferometer, having a number of known frequency dependent transmission characteristics in the tuning range of the optical source. This unit scans the frequency of the optical source via a frequency control signal over a frequency range and measures the optical intensity of the optical source output light after it has passed through the optical filter. The measured transmission and frequency control signal values are processed and stored in memory and constitute a measured absorption pattern. Once acquired for a frequency range, this pattern is compared to the theoretical transmission pattern of the optical filter. Correspondences are made to identify the transmission features against their known counterparts. A relationship between the frequency control signal and actual frequency of the optical source is established. The frequency calibration of the optical source over many frequency points is achieved. The invention is especially suited to the frequency calibration of tunable laser sources, such as semiconductor lasers and external cavity lasers.

23 Claims, 8 Drawing Sheets

ABSOLUTE OPTICAL FREQUENCY CALIBRATOR FOR A VARIABLE FREQUENCY OPTICAL SOURCE

FIELD OF THE INVENTION

This invention relates to optical sources, and more particularly to the absolute frequency calibration of optical sources using the known transmission characteristics of an optical filter.

BACKGROUND OF THE INVENTION

Optical sources that provide a very stable and absolutely known frequency are needed in many technical fields. Optical communications is one of them. Many communication techniques rely on the precise knowledge and control of the optical frequencies of the optical sources, namely the semiconductor lasers. Optical heterodyne systems and optical frequency (or wavelength) division multiplexing (FDM or WDM) systems are among the most common.

One problem that is associated with semiconductor lasers is their optical frequency dependency to the injection current and the temperature of their junction. Very precise control of these parameters can be used to minimize the fluctuations of the laser frequency with time, but the absolute value of the frequency cannot be known with sufficient precision since the fabrication techniques of the lasers do not always permit the precise control of these parameters.

In order to be able to use such lasers in applications where absolute frequency values are required, a frequency calibration must be performed. This calibration establishes the relationship between the value of the parameters which affects optical frequency, and the actual absolute optical frequency itself. Such a calibration may be performed for one or many frequency values. Calibration may also be represented by a mathematical relationship between actual frequency and the frequency affecting parameter values.

A number of solutions have been proposed to absolutely calibrate the frequency of laser sources. One of them proposes to use an absorption line of an atomic or molecular gas as a frequency reference. Many gases show absorption at very precise optical frequencies. The frequency dependency of the absorption lines to external conditions such as pressure and temperature is sufficiently low for most of the communication needs. Although many other types of optical references may be used, the stability and intrinsic simplicity of gas references make them a very interesting choice for many applications, especially for multiwavelength optical communication systems.

One commonly used technique to transfer the absolute frequency value of the reference gas absorption lines to the optical source is to constantly adjust the frequency of the source in such a way that the absorption of the light in the gas is kept at a maximum or at a specified value. To accomplish this, the light of the source is passed through a transparent cell containing the reference gas and is measured by a light intensity measuring device. The necessary adjustments to the frequency control signal of the source are done using feedback to keep the desired absorption value. If the frequency characteristics of the absorption lines of the gas are well known, the frequency of the laser is therefore known with precision. It is therefore calibrated for this one frequency value.

However, this technique has a few drawbacks. First, for some reference gases, many absorption lines are present and can be reached within the tuning range of the optical source. In many frequency-locking systems, it is impossible to know, without human intervention, on which absorption line the laser will lock on. Therefore, the absolute frequency of the source is not known. The need for human intervention limits considerably the usefulness of this technique for commercial application.

A second drawback is that the locking technique gives a one-point calibration of the optical source. The exact frequency of the source light is known for one frequency control signal value only. Other frequency values cannot generally be deduced for other frequency control signals from this single point. This partial calibration may be a severe limitation in applications where the frequency of the source must be dynamically changed.

U.S. Pat. No. 5,450,207 by Fomenkov discloses a method and apparatus for calibrating a laser wavelength control mechanism which is used to control the frequency of a laser source. The method and apparatus described in this patent requires the use of a hollow cathode lamp containing a gas which provides absorption of the light at a known wavelength. This lamp requires electrical discharges to observe the absorption line. These types of absorption devices produce a single absorption line for a unique control value. No ambiguity is therefore present on which absorption line is used, but the calibration is limited to one frequency value. Other gases and lamps are required to produce additional absorption lines.

U.S. Pat. No. 5,033,114 by Jayaraman et al. is also directed to laser calibration. As with Fomenkov, Jayaraman et al. make use of a glow discharge device which has an optogalvanic response wavelength within the tuning range of the laser diode. As in Fomenkov, the apparatus is limited to calibration using a single absorption line. Jayaraman make use of a pre-calibrated interference filter to bring the laser wavelength to the desired absorption line. In a modified embodiment, the use of this filter could permit the unambiguous selection of many absorption lines within the same gas if more than one were present. The major drawback of this technique is that the precision of the apparatus is greatly dependent on the precision of the interference filter calibration.

Accordingly, a need exists for a method and apparatus for calibrating to an absolute value a variable frequency optical source at one or more frequency control values, using an optical device showing one or more light absorption features at absolutely known frequencies, and without the use of any preliminary calibration.

SUMMARY OF THE INVENTION

It is therefore an object of the present invention to provide a method and apparatus for calibrating a variable frequency optical source to an absolute value, while overcoming the problems associated with the prior art.

Another object of the present invention is to provide a method and apparatus for calibrating to an absolute value, a variable frequency optical source which is tuned over a predetermined range of frequencies.

Yet another object of the present invention is to provide a method and apparatus for the discrete calibration of a variable frequency optical source to an absolute value, wherein the light generated by the variable frequency optical source is transmitted through an optical filter having a plurality of known transmission features at fixed optical frequencies within the tuning range of frequencies of the optical source.

Yet another object of the present invention is to provide a method and apparatus to enable a variable frequency optical source to be frequency-locked relative to transmission features of the optical filter.

Yet another object of the present invention is to provide a method and apparatus for the continuous calibration of a variable frequency optical source to an absolute value, wherein the light generated by the variable frequency optical source is transmitted through an optical filter having one or more known transmission features at fixed optical frequencies within the tuning range of frequencies of the optical source.

Yet another object of the present invention is to provide a method and apparatus for measuring the actual absolute operating frequency of an unknown optical signal.

Yet another object of the present invention is to provide a method and apparatus to enable a variable frequency optical source to be frequency-locked to any frequency within the tuning range of the optical source.

The present inventions achieve the aforementioned objects by discretely calibrating a variable frequency optical source. Calibration is achieved by scanning a range of optical frequencies and measuring for a plurality of frequencies the power transmitted through an optical filter means which presents transmission features at absolutely known frequencies, such as an absorption gas cell, a calibrated Fabry-Perot device transmitting at predetermined resonance frequencies, a calibrated optical filter medium or plurality of calibrated optical filters, or a calibrated sensitive diffractive element such as an arrayed waveguide grating (AWG), the latter dividing the light into frequency channels for separate detection. The optical filter means may comprise a beam splitter and a plurality of the aforementioned filter devices in order to obtain optical sensitivity at a plurality of absolutely known frequencies. A "transmission feature" means a detectable transmission variation through the optical filter means occurring at a specific optical frequency. The transmission pattern thus acquired is compared to the known transmission pattern of the filter, and correspondences between measured and known transmission features are made. Once enough features are identified, correspondences between the frequency control signal and the known frequency on these features are established. The continuous calibration curve of the optical source can then be computed from the discrete calibration points obtained.

According to the invention, there is provided a method of performing the frequency calibration of a variable frequency optical source, the optical source producing light at an optical frequency within a range of frequencies, comprising the steps of:

(a) scanning the control signal through a range of values to cause the variable frequency optical source to emit light through at least a part of the range of frequencies;

(b) passing at least a part of the light generated by the variable frequency optical source through an optical filter means having a plurality of known frequency dependent transmission features at fixed optical frequencies within the range of frequencies;

(c) measuring an intensity of the light transmitted through the filter means to determine values of the frequency control signal responsible for generating optical frequencies from the source corresponding to the plurality of known transmission features at fixed optical frequencies; and (d) determining a calibrated control signal value for the optical source for the predetermined operating frequency by assessing the values of the frequency control signal determined in the previous step.

Preferably, the method according to the invention further comprises steps of:

(e) controlling the source to operate at the predetermined operating frequency by setting the control signal value to the calibrated value.

(f) passing at least a part of the light through a filter means having a transmission feature substantially at the predetermined operating frequency;

(g) detecting an intensity of the light from the filter means to generate a feedback intensity signal; and (h) adjusting the control signal value in response to the feedback intensity signal to lock the source on the transmission feature.

Also preferably, the step of determining comprises recognizing the plurality of known transmission features; selecting one of the values of the frequency control signal responsible for generating an optical frequency from the source corresponding to one of the plurality of known transmission features. Step (d) preferably comprises: obtaining a frequency calibration function by assessing the values of the frequency control signal determined in step (c), the calibration function giving a control signal value for any desired optical frequency value within at least a part of the range of frequencies.

Also preferably, the step of performing the frequency calibration of the source comprises causing the optical source to sweep through at least a part of the range of frequencies, and the method further comprising steps of:

mixing an unknown optical signal with at least a part of the light generated by the variable frequency optical source to obtain a mixed optical signal;

detecting the mixed optical signal to produce an RF beat signal at a frequency equal to the frequency difference between the unknown optical signal and the light from the optical source;

filtering the RF beat signal by means of an RF filter to transmit only a part of the RF beat signal which is at a resonance frequency of the RF filter and detecting an output of the RF filter;

recording a value of the frequency control signal at which the RF beat signal is at the resonance frequency during the sweep; and computing a frequency of the light from the optical source using the recorded frequency control signal value and the function, and computing from the optical source frequency a frequency of the unknown optical source.

BRIEF DESCRIPTION OF THE DRAWINGS

The invention will be better understood by an examination of the following description, together with the accompanying drawings, in which.

DESCRIPTION OF THE PREFERRED EMBODIMENTS

Figure 1:
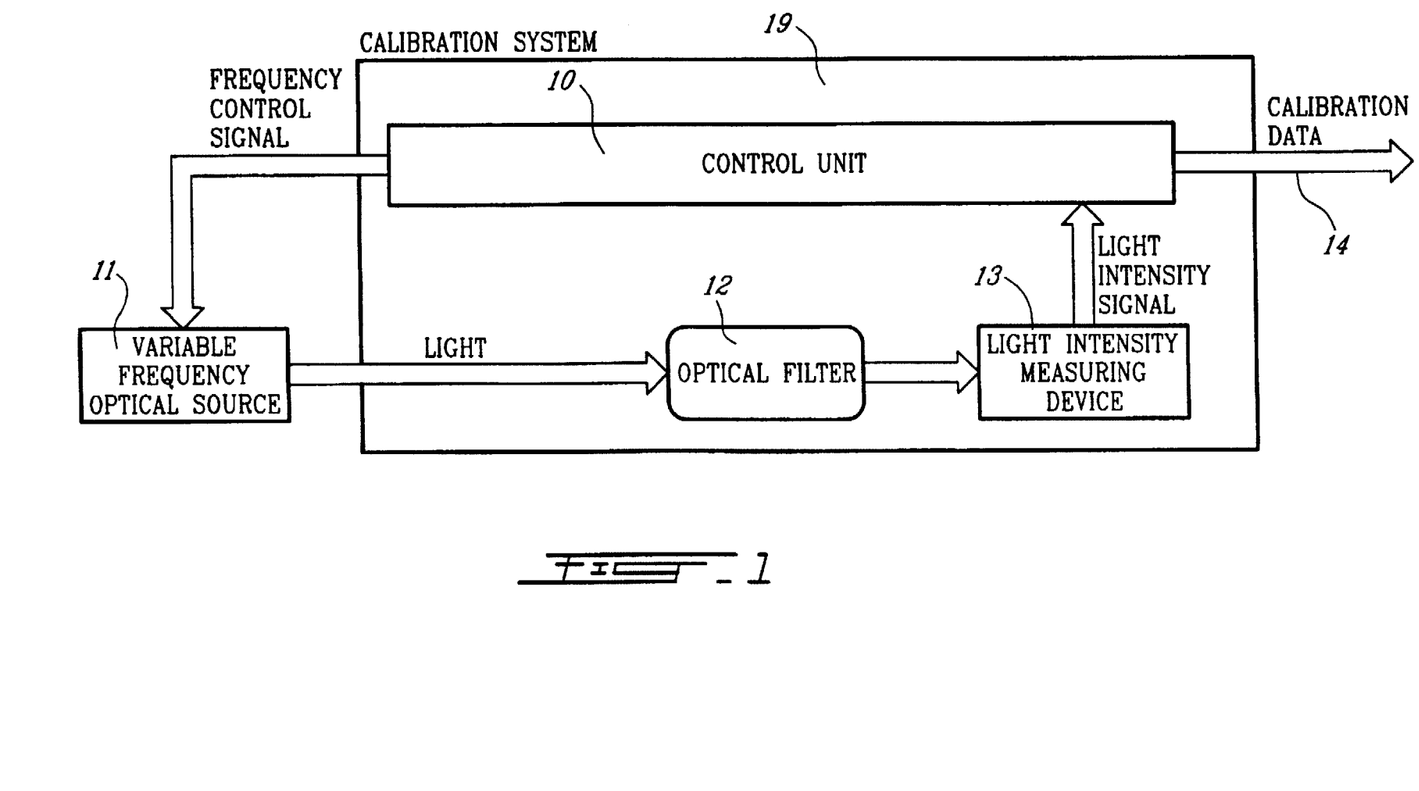
FIG. 1 is a block diagram of the automatic absolute frequency calibration system in accordance with a preferred embodiment of this invention.

FIG. 1 shows the preferred embodiment of the automatic absolute optical frequency calibration system 19, which utilizes a method for calibrating a variable frequency optical source according to the invention. In this implementation, the external variable frequency optical source 11 to be frequency calibrated is frequency-tuned by a control unit 10 via a frequency control signal. The light of the source is passed through an acetylene gas cell acting as an optical filter 12 having absolutely known transmission features, namely the known absorption lines of the gas. The light reaches a light intensity measuring device 13 which provides to the control unit 10 a light intensity signal that represents the intensity of the light after it has been absorbed by the optical filter.

The absolute frequency calibration procedure begins as follows. A frequency scan of the variable frequency optical source 11 is performed by the control unit 10 by varying the frequency control signal within a predetermined range. For a plurality of frequency control settings, the intensity of the light transmitted through the reference gas 12 is measured by the light intensity measuring device 13 and this information is transmitted to the control unit 10. The control unit processes this information and extracts and stores significant features of the transmitted light along with the frequency control signal value for which it was observed. A transmission profile curve of the optical filter is thus obtained.

Figure 2:
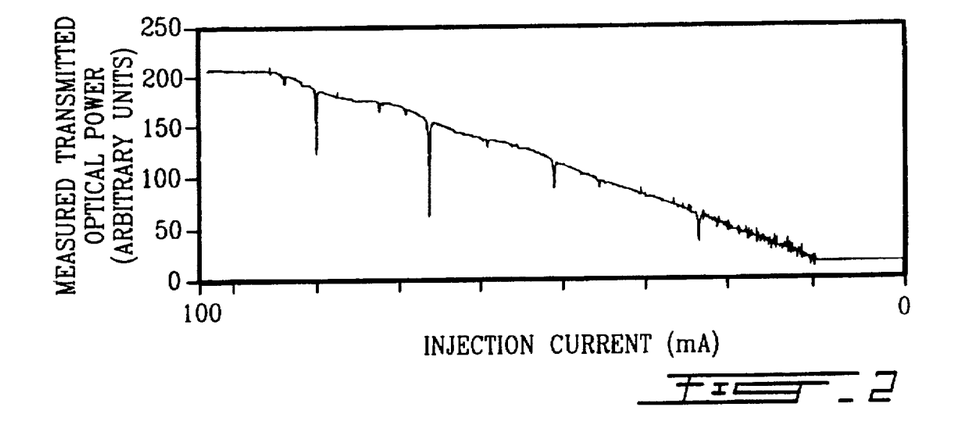
FIG. 2 represents the power of the light beam measured after the $^{12}C_2H_2$ acetylene absorption cell for a typical frequency (injection current) scan.

FIG. 2 shows a typical absorption profile curve as measured by this procedure. The specific implementation which provided the result of FIG. 2 made use of a semiconductor laser as a variable frequency source and the optical filter used is a passive transparent cell containing 30 Torr of $^{12}C_2H_2$ acetylene gas. The nominal frequency of the laser is around 196 THz (1526 nm) and it is frequency-tuned by means of the injection current. For these types of lasers, the optical frequency varies inversely with injection current but the operational frequency of the laser cannot be predicted with sufficient precision unless a calibration is carried out. FIG. 2 shows the results of an injection current (frequency control signal) scan from 100 mA to 0 mA by steps of –0.04 mA, which corresponds approximately to a frequency scan from 196.10 THz to 196.35 THz by steps of 100 MHz. The acetylene gas presents many absorption lines in this frequency range which can be observed as sharp dips in the transmission curve. Emitted power from the laser source also varies during the injection current scan, which shows in FIG. 2 by the overall negative slope of the curve.

Figure 3A:
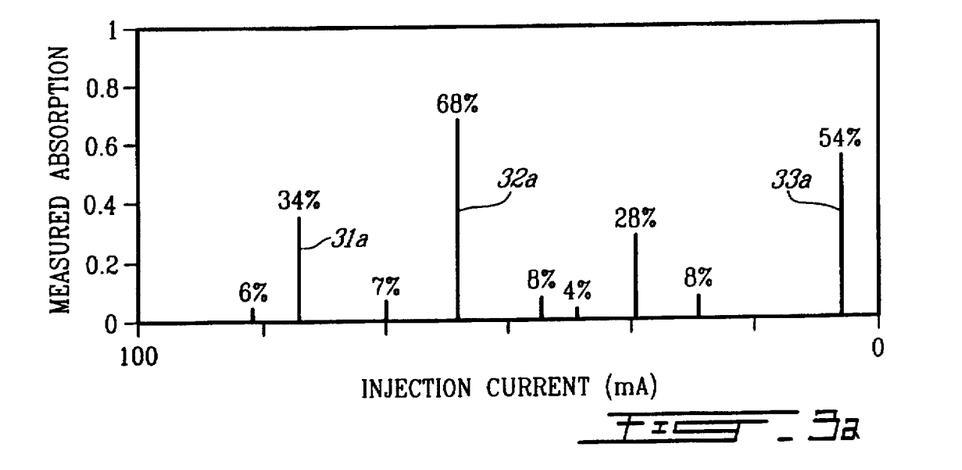
FIG. 3a shows the signature table computed from the absorption pattern measured in FIG. 2.

As a part of this acquisition process of this implementation, the measured absorption profile curve is further processed by the control unit 10 in order to extract the most significant features of the measured transmission spectrum. This processing consist in calculating a cubic spline curve which interpolates the absorption profile based on the overall profile of the curve. With this interpolation, the power that would be measured if no optical filter was present can be estimated. Since the non-absorbed and absorbed power values are known at the various absorption frequencies, the corresponding absorption ratio can be computed. Since this figure is a power ratio, the absolute value of the power levels measured is irrelevant. A filtering process then finds and extracts all the lines with an absorption level over a specified value. This information constitutes a signature table of the gas. Each line is represented by its maximum absorption amplitude and the corresponding frequency control signal value for which it was observed. FIG. 3a shows graphically the frequency control signal position and amplitude of the absorption lines extracted from the curve shown in FIG. 2.

Figure 3B:
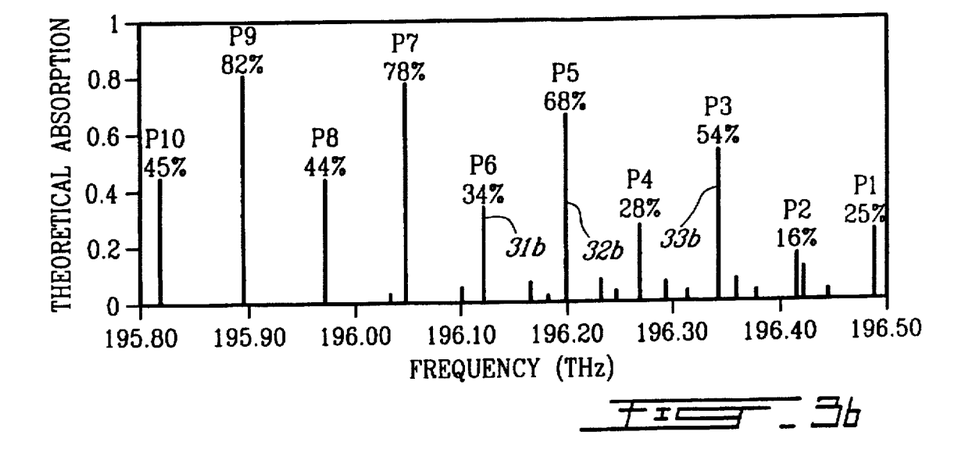
FIG. 3b shows the theoretical signature of $^{12}C_2H_2$ acetylene gas.

The next step of the calibration procedure is the identification of the transmission features extracted previously. The knowledge of the theoretical frequency and/or transmission coefficients for the frequency band scanned is used to achieve this identification. As a reference, FIG. 3b shows the theoretical absorption signature of the previously mentioned acetylene gas. The signature table measured by the control unit corresponds to a part of the total signature of the gas. The task of the control unit is to associate each measured absorption lines with each corresponding known absorption line of the acetylene gas. As an illustrative example, one can see that lines 31a, 32a and 33a of the measured absorption spectrum in FIG. 3a must correspond to lines 31b, 32b and 33b in FIG. 3b respectively.

In the proposed implementation, a non-linear two variable discrete correlation technique is used by the control unit to establish this correspondence automatically. This technique consists in taking two absorption lines from the measured signature table and two lines from the known signature. The hypothesis that the two pairs of lines represent the same real lines is made. A numeric value is then computed to evaluate the validity coefficient of this hypothesis by testing the relative position and amplitude of all the lines in the signatures once the two tables are scaled to match the selected hypothesis lines. This procedure is repeated for each pair of lines in the known signature. The hypothesis which gave the highest validity coefficient is retained as the best match.

Once a match is established, the correspondence between the frequency control signal value and the actual frequency of the optical source is known for each transmission features that were measured. The discrete frequency calibration of the variable frequency optical source is then established and the frequency calibration data 14 is provided as the final result.

The calibration data may consists in a list of frequency control value with their corresponding actual frequency values, or as a mathematical relationship between the frequency control value and the actual frequency, or by any other representation of the calibration information. The calibration data may be provided as displayed values or equations, as digital or analog data, or by any other information transfer means.

Figure 4:
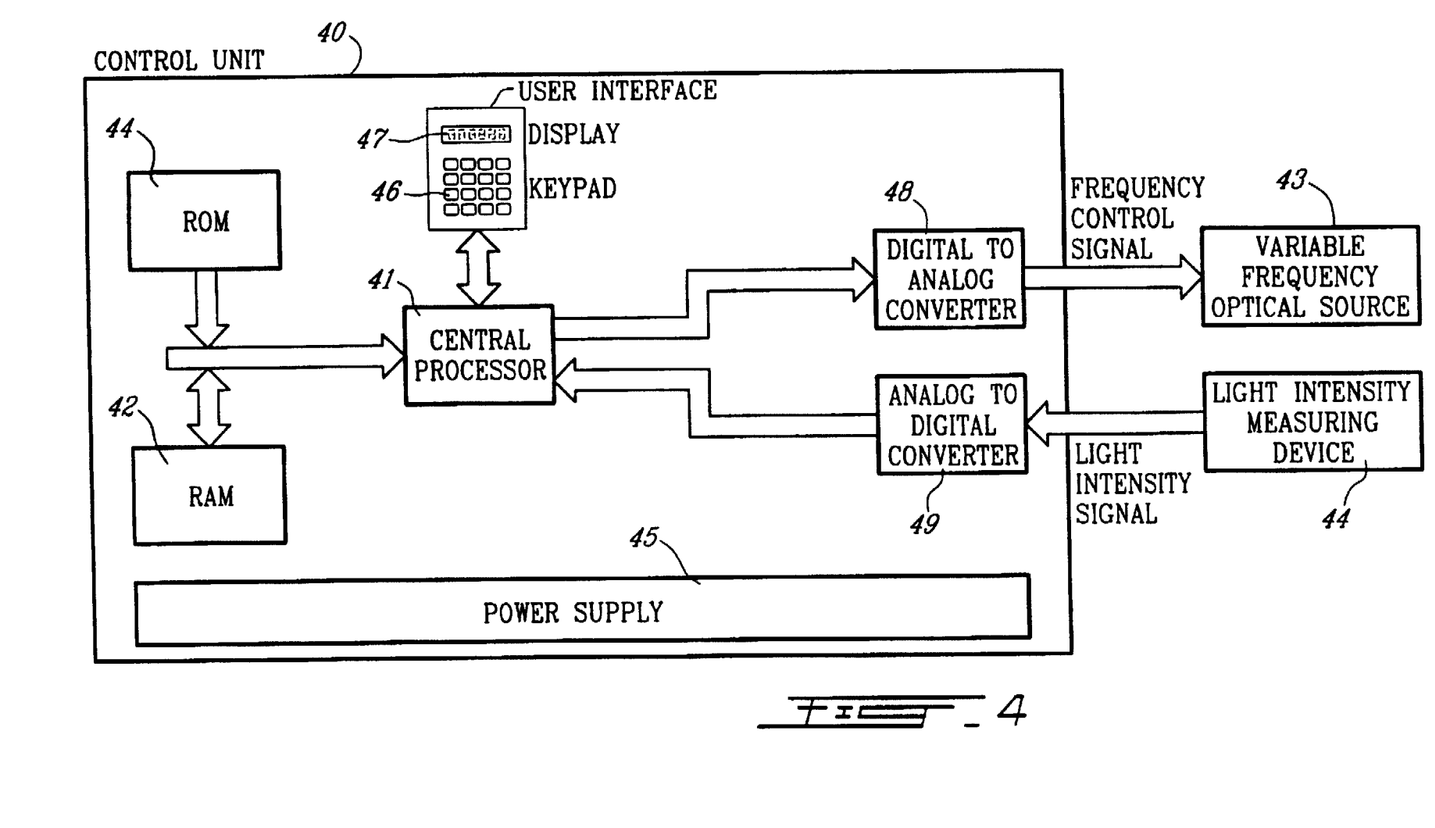
FIG. 4 is a block diagram of the control unit for use with the measurement and calibration system of the present invention.

The control unit 10 which scans the frequency of the source, extracts the significant features, matches this signature with a theoretical signature and then computes the calibration points, may be of various configurations. A typical system uses a computer equipped with input/output adapter cards compatible with the signal format of the frequency control signal of the source and the light detection signal. Any system capable of memorizing theoretical transmission patterns and making comparisons and decisions against a measured pattern could fulfill the role of the control unit. A block diagram of the control unit used in this implementation is shown in FIG. 4. The control unit 40 makes use of a central processor 41 which in this case is a Motorola 68HC11 processor. Obviously, other processors can be used. The central processor is provided with a volatile memory, such as RAM 42 which is used for storing the measured transmission pattern of the optical filter, and for storing the corresponding extracted signature table. A non-volatile memory, such as ROM 44 is used for storing the known or theoretical absorption pattern of the gas used in the absorption cell and the software which implements the calibration procedures. Power supply circuit 45 provides the required power to the control unit 40. A user interface enables an operator to use Input/Output devices, such as keypad 46 and display 47 to operate the control unit. The analog-to-digital and digital-to-analog converters 48 and 49, respectively are used for interfacing with the optical source 43 and the light measuring device or optical receiver 44.

The frequency control and the light intensity signals could be analog proportional voltages or currents, digital values, data transferred via a GPIB bus or any other information transmission scheme.

The variable optical frequency source 11 can be any device capable of providing a sufficiently narrow bandwidth optical signal compared to the frequency width of the features of the optical filter. Laser sources are the most suitable candidates for this function. Many semiconductor lasers and external cavity lasers can be tuned by means of a frequency control signal. Non-tunable lasers can be made tunable by the use of external frequency shifter devices such as accousto-optical modulators, and therefore can be regarded as well as tunable sources for our applications.

Figure 8:
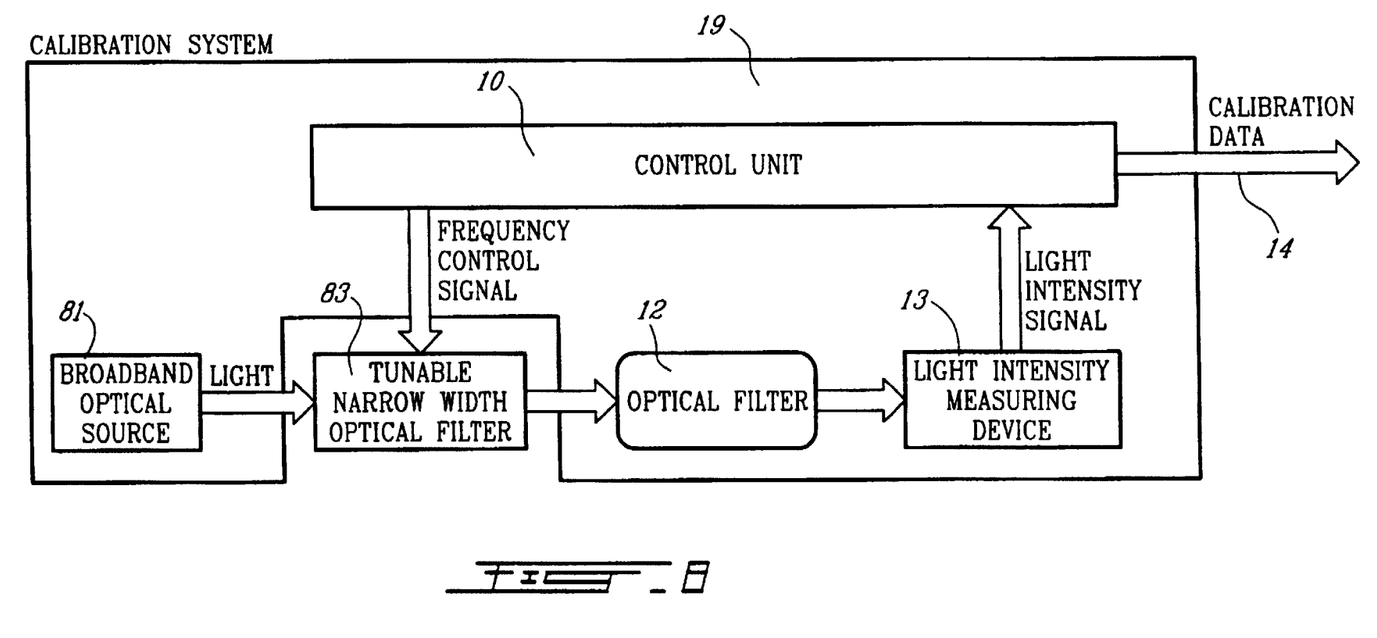
FIGS. 8 and 9 are block diagrams of two variants using a broadband light source and a tunable light filter.
Figure 9:
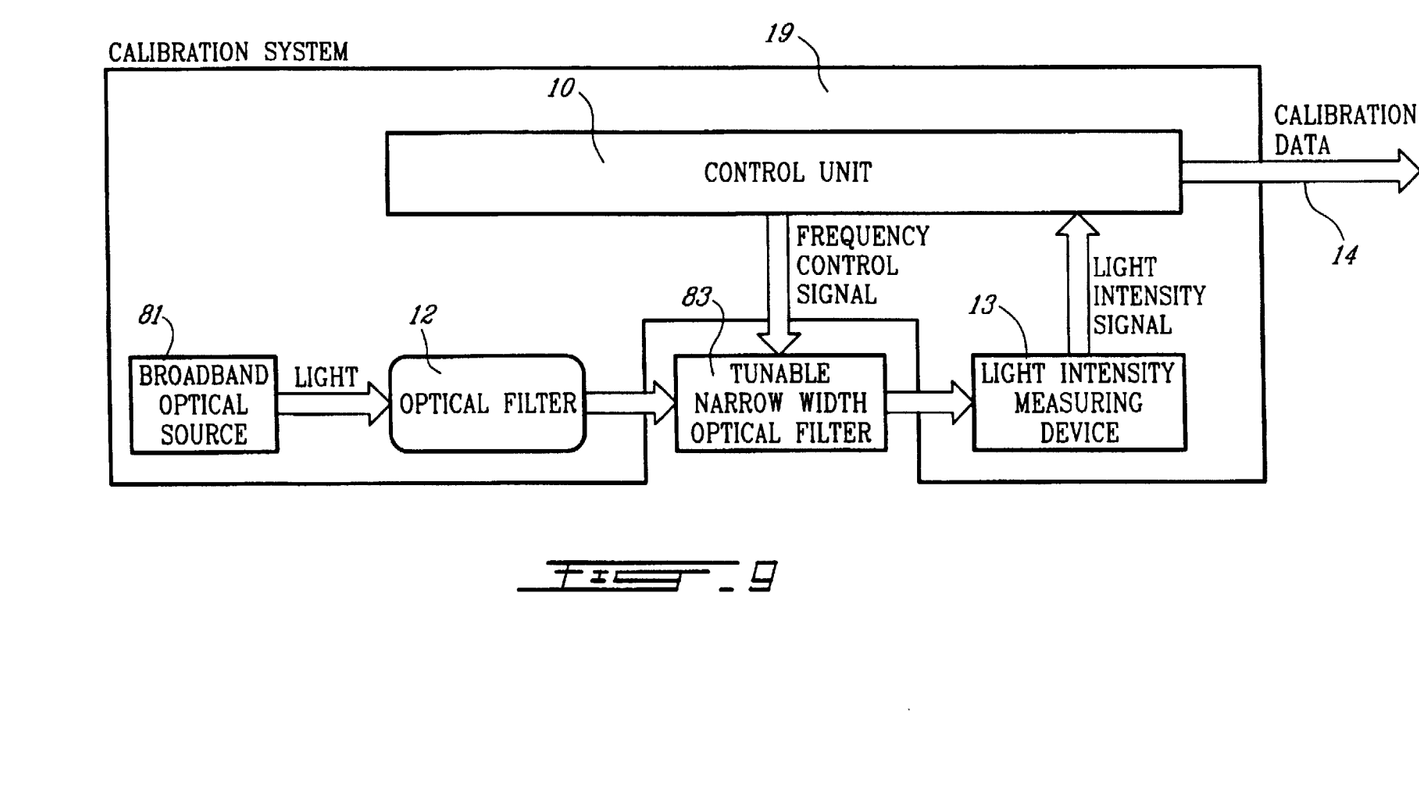

Non-laser sources are also possible candidates as optical sources. A large optical bandwidth source 81 such as a light emitting diode or a white light can be filtered by a narrow tunable optical filter 83 controlled by the frequency control signal, therefore achieving the same narrow bandwidth tunable optical source. This filtering may be accomplished before (see FIG. 9) or after (see FIG. 8) the light has passed through the optical filter, which is equivalent. In an alternative embodiment, a white light transmitted through the optical filter may be dispersed by means of a diffraction grating onto an array of photodetectors. Each photodetector therefore detects light at a specific frequency. The frequency control signal would select which photodetector is read, achieving the same frequency selective detection as described in the present invention.

Our implementation of the variable frequency source was a semiconductor laser connected to a voltage controlled current source, combined with a temperature stabilization circuit.

The optical filter 12 may be of various configurations. In the preferred embodiment, the optical filter characteristics are as follows:
(1) light from the optical source can be modified by it,
(2) it displays one or more absorption or transmission features at fixed optical frequencies in the tuning range of the source, and
(3) the frequencies and optionally the amplitude of these absorption or transmission characteristics are well known.

These characteristics can be achieved by using a single 5 cm long, 20 Torr pressure $^{12}C_2H_2$ acetylene gas cell, as has been used in this implementation. Other gases, or combination of gases may be used for use in different frequency bands. Those skilled in the art will recognize that a Fabry-Pérot interferometer, a Bragg grating filter, or any combination of these devices or other devices may constitute adequate optical filters, provided they are actively or passively calibrated with an accuracy sufficient for the intended application.

The light intensity measuring device 13 is any apparatus that can give a measure of the intensity of the light at the optical frequencies within the range of the optical source. Semiconductor photodetectors are commonly used devices. Any arrangement which could be used to measure the absorbed optical power into the absorption cell would fall into the category of an intensity measuring device. As an example, a pair of photodetectors could provide directly a measure of the absorption which would free the control unit of the additional task of interpolating the non-absorbed power. Furthermore, the detector could provide to the control unit absorption values for only those features which have sufficient absorption, further lightning the control unit processing task. A germanium photodetector connected to a simple transimpedance amplifier has been used as an optical receiver for the measurement and calibration apparatus in the present invention.

Figure 5:
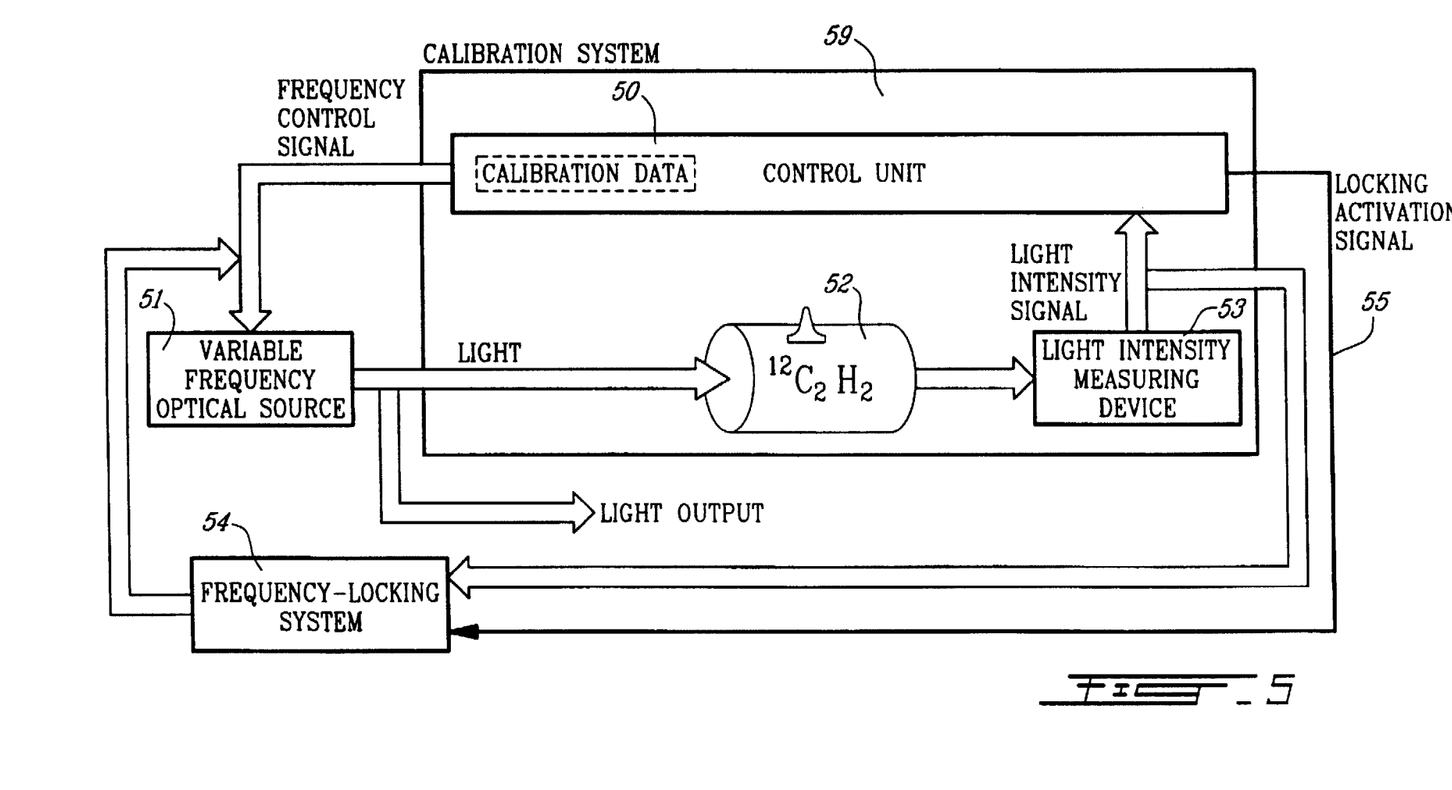
FIG. 5 is a block diagram of the frequency calibration system used for locking a laser source relative to an absorption line of a reference gas, according to another embodiment of the present invention.

In further embodiment of the invention, the unambiguous locking of the variable frequency optical source relative to a feature of an optical filter can be provided using the previously described discrete frequency calibration. The locking of the source stabilizes its frequency to a high degree of accuracy. The source is initially frequency scanned and the features of the filter are measured and identified as described. Once the features are recognized, the frequency of the laser source can be brought back near a known absorption feature of the reference gas and the laser can be frequency-locked onto a feature of the optical filter using a commonly used locking technique. In the current implementation, a 30 Torr, 5 cm long $^{12}C_2H_2$ acetylene gas cell is also used as an optical filter with a DFB semiconductor laser as an optical source. FIG. 5 shows a block diagram of this specific implementation. A frequency calibration system composed of a control unit 50, a variable frequency optical source 51, an absorption cell 52 containing the acetylene gas and a light intensity measuring device or optical receiver 53 are used to identify the transmission features of the gas. A locking system 54 can be activated by the control unit 50 by means of a locking activation signal 55. Once enabled, the locking system keeps the frequency of the laser 51 within or near an absorption line of the gas. This locking system 54 can typically use the output of the light measuring device 53 as a means to detect any deviation of the frequency, and apply the necessary correction to the frequency control signal.

The locking activation signal is provided by an additional output port installed in the control unit. Those skilled in the art will recognize that this modification is a simple upgrade of the previously described control unit. No further details will therefore be provided herein.

In another embodiment of this invention, the continuous frequency calibration of the variable frequency optical source is accomplished. The same apparatus than the one used for the discrete frequency calibration is used, as only more computations are involved. Initially, the discrete frequency calibration of the source is performed, as described previously. The actual operating frequency of the variable frequency optical source is therefore known for some frequency control signal values only. Using these calibration points, a mathematical relationship may then be computed by the control unit 10 to establish a continuous mathematical relation which predicts the actual operating frequency for any continuous frequency control signal value. A continuous calibration function is thus obtained and constitutes the calibration data 14. Assumptions on the theoretical calibration function may be used, such as linear or quadratic, or any other pertinent function. Parameters for these functions can then be obtained from the discrete calibration points. Curve fitting or spline functions can also serve as calibration function. In the actual implementation, a inverse linear relationship f=1/(ai+b) is assumed between the injection current i of the semiconductor laser and its effective frequency, f. a and b are deduced from two discrete calibration points.

As a further embodiment of this invention, the continuous frequency calibration of the variable frequency optical source could be accomplished prior to the locking of the laser on one of the transmission features of the optical filter. This continuous calibration would permit the locking of the source within or near a transmission feature of the optical filter that could not be identified for any reason. Since only more computation of the control unit are involved, the apparatus illustrated in FIG. 5 also corresponds to this embodiment.

Figure 6:
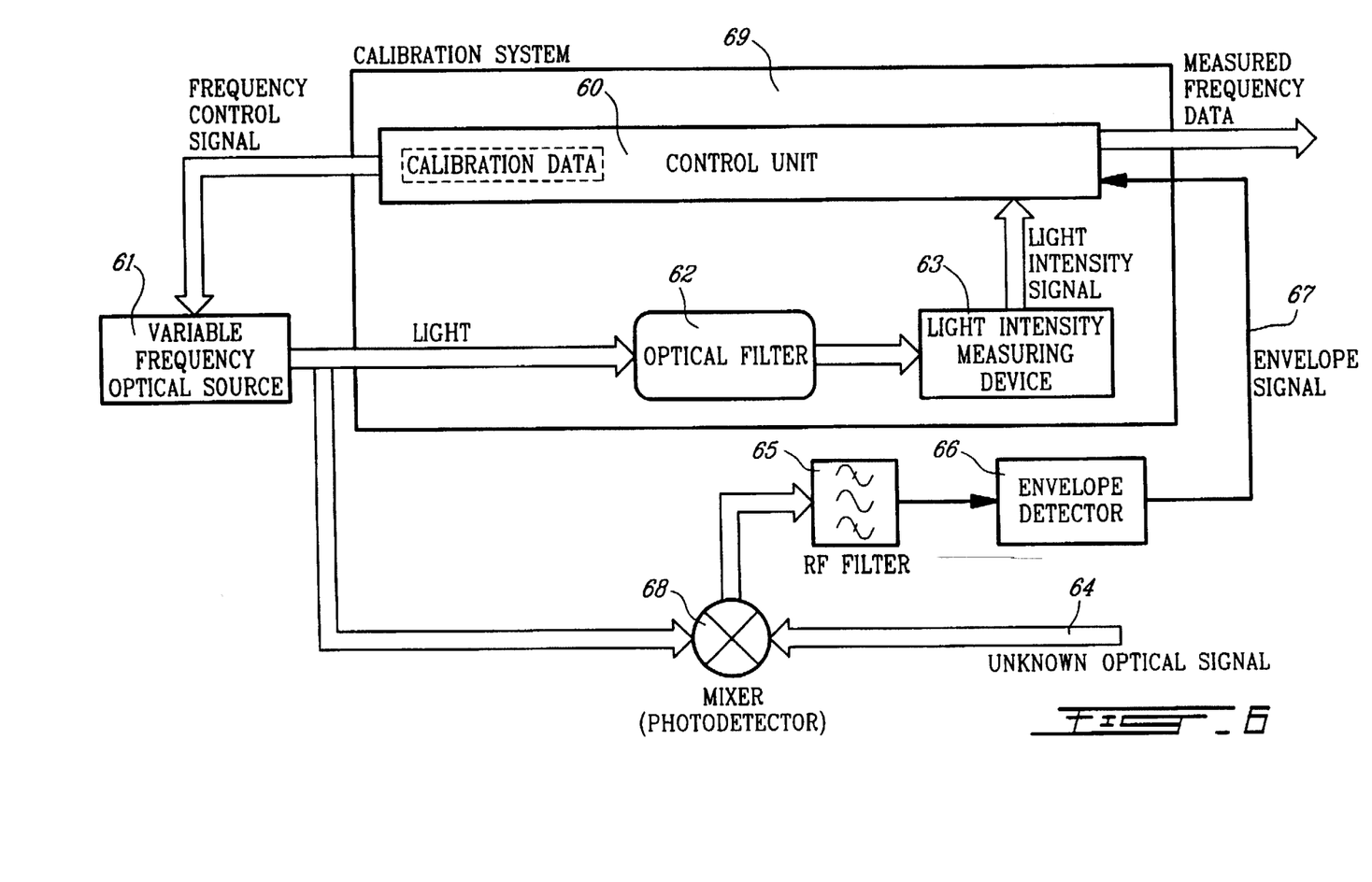
FIG. 6 is a block diagram of the frequency calibration system used for determining the frequency of an unknown optical signal, according to another embodiment of the present invention.

In another embodiment of the invention, the frequency of an unknown optical signal is measured using the frequency calibration method of the present invention. The frequency of this unknown signal may be fixed and is not necessarily in the proximity of a transmission feature of the optical filter, such as an absorption line in reference gas. Furthermore, it is not necessary that the source be frequency tuned by means of a frequency control signal. FIG. 6 shows the configuration of such an optical frequency measuring system. A variable frequency optical source 61 is continuously calibrated with a optical filter 62 with known transmission features as was described previously. The light of this source is mixed with the light of the unknown optical signal 64 to produce a beat note frequency when exiting from the photodetector 68 which acts as a mixer. An RF filter 65 transmits only those RF beat note frequencies which occur at its resonance frequency. An envelope detector 66 detects whether an RF signal is present after the filtering process and provides this information to the control unit 60 by means of a envelope signal 67. Together, the filter 65 and the detector 66 form a device which indicates to the control unit when the two optical frequencies are separate by a frequency difference equal to the resonance frequency of the filter. By tuning the variable frequency optical source through its frequency range and measuring the output of the envelope detector 66, the control unit 60 can determine for which frequency control signal value the frequency difference between the two sources produced a beat note at the resonance frequency of the RF filter 65. Since the frequency optical source 61 is calibrated and the resonance frequency of the filter 65 is known, the frequency of the unknown laser may be computed and is provided as frequency measurement data.

A high frequency counter may be used to measure the beat note frequency between the two lasers and provide this information to the controller which will use this information to compute the exact frequency of the unknown laser. The counter may be viewed as a generalization of the RF filter and envelope detector combination which provide information on a specific beat note frequency only.

Figure 7:
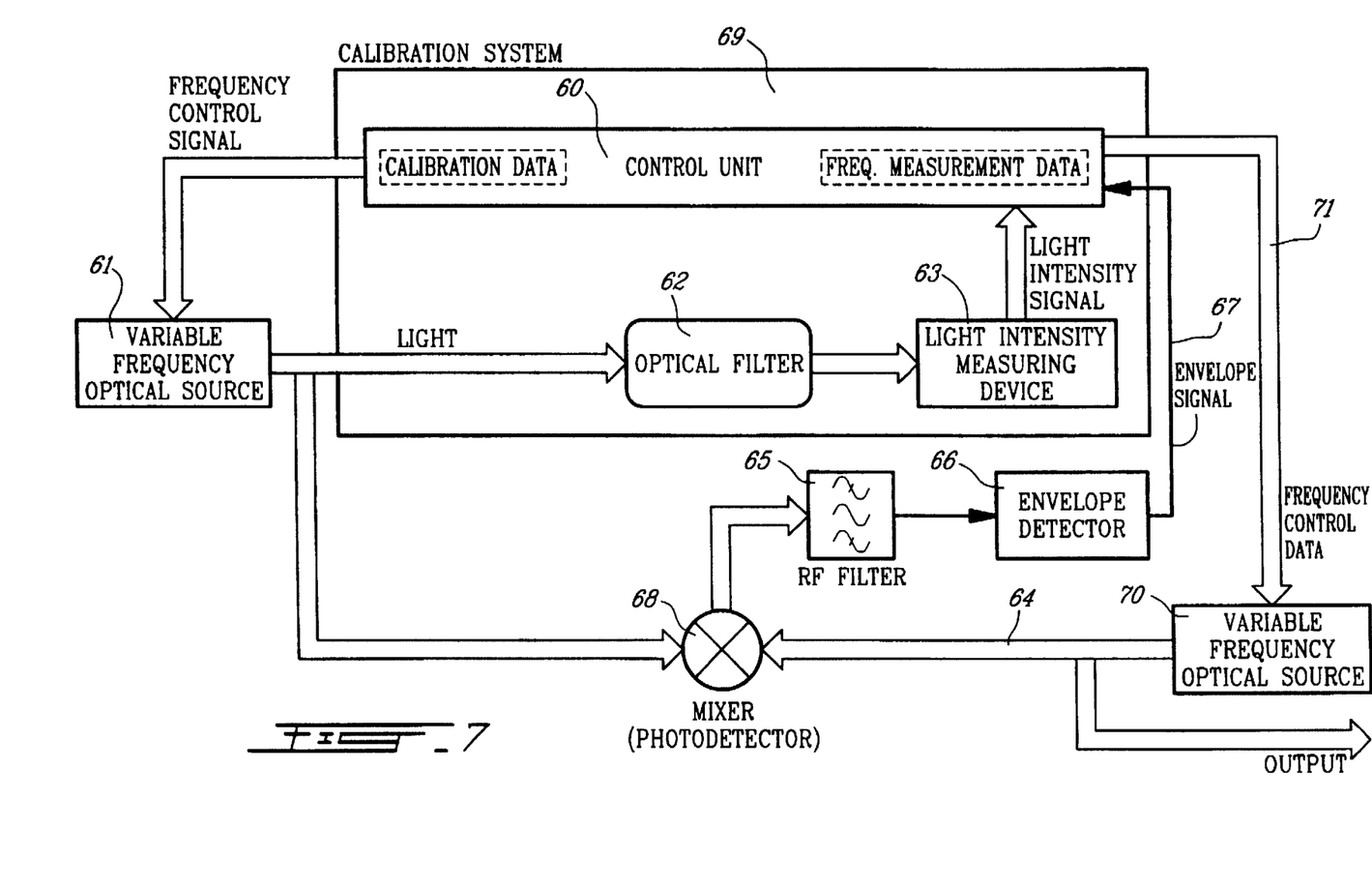
FIG. 7 is a block diagram of the frequency calibration system used for locking the frequency of an external variable frequency optical source to any frequency in its tuning range, according to another embodiment of the present invention.

The envelope signal 67 is provided to an additional input port installed in the control unit. Those skilled in the art will recognize that this modification is a simple upgrade of the previously described control unit. No further details will therefore be provided herein In a further embodiment of this invention, the frequency stabilization of a variable frequency optical source at a predetermined absolute frequency may be accomplished for any frequency within the tuning range of the source, as illustrated in FIG. 7. In replacement to the unknown optical source present in the previous embodiment, a second variable frequency optical source 70 may be used. The frequency of this external source may be measured as described in the previous embodiment. The measured frequency is then compared to the predetermined desired frequency, and a frequency error is computed. This error is sent through a feedback filter implemented by the control unit 10 which apply a correction to the frequency control signal 71 of the second source 70 such as to minimize the error. Periodic corrections may be made to constantly maintain the frequency of the laser output 64 at the desired value.

Variations of the particular embodiments herewith described will be obvious to one skilled in the art, and accordingly the embodiments are to be taken as illustrative rather than limiting, the true scope of the invention being set out in the appended claims.

We claim:

1. A method of performing the frequency calibration of a variable frequency optical source to operate at a predetermined operating frequency, said source producing light at an optical frequency within a range of frequencies in response to a frequency control signal, comprising the steps of;
   (a) scanning said frequency control signal through a range of values to cause said variable frequency optical source to emit light through at least a part of said range of frequencies;
   (b) passing at least a part of the light generated by said variable frequency optical source through an optical filter means having a plurality of known, unambiguously identifiable frequency dependent transmission features at fixed optical frequencies within said part of said range of frequencies;
   (c) measuring an intensity of the light transmitted through said filter means to determine at least two reference values of said frequency control signal responsible for generating optical frequencies from said source corresponding to said plurality of known transmission features at fixed optical frequencies; and
   (d) determining a calibrated value for said frequency control signal at which said optical source produces light at said predetermined operating frequency by assessing said reference values of said frequency control signal determined in the previous step.

2. The method as claimed in claim 1, further comprising steps of:
   (e) controlling said source to operate at said predetermined operating frequency by setting said control signal value to said calibrated value.

3. The method as claimed in claim 1, wherein said step of determining comprises recognizing said plurality of known transmission features.

4. The method as claimed in claim 1, wherein said step (d) comprises:
   obtaining a frequency calibration function by assessing said values of said frequency control signal determined in step (c), said calibration function giving a control signal value for any desired optical frequency value within at least a part of said range of frequencies.

5. The method as claimed in claim 4, further comprising of:
   (e) controlling the source to operate at the predetermined operating frequency by setting the control signal value to the calibrated value.

6. The method as claimed in claim 5, wherein said predetermined operating frequency is one of said fixed optical frequencies of said filter means.

7. The method as claimed in claim 4, further comprising steps of:
mixing an unknown optical signal with at least a part of the light generated by said variable frequency optical source to obtain a mixed optical signal;
detecting the mixed optical signal to produce an RF beat signal at a frequency equal to the frequency difference between said unknown optical signal and the light from said optical source;
filtering said RF beat signal by means of an RF filter to transmit only a part of said RF beat signal which is at a resonance frequency of the RF filter and detecting an output of said RF filter;
recording a value of said frequency control signal at which said RF beat signal is at said resonance frequency during said sweep; and
computing a frequency of said light from said optical source using said recorded frequency control signal value and said function, and computing from said optical source frequency a frequency of said unknown optical source.

8. The method as claimed in claim 1, wherein said optical filter means comprises a gas cell and said transmission features are absorption lines of gas in said cell.

9. The method as claimed in claim 8, wherein said gas comprises acetylene gas.

10. The method as claimed in claim 1, wherein step (b) comprises stepping said control signal through said range of values, and step (c) comprises measuring and recording said intensity for each step through said range of values.

11. The method as claimed in claim 4, wherein step (b) comprises stepping said control signal through said range of values, and step (c) comprises measuring and recording said intensity for each step through said range of values.

12. The method as claimed in claim 1, wherein said variable frequency optical source comprises a semiconductor laser.

13. The method as claimed in claim 12, wherein said semiconductor laser is frequency-tuned by varying its injection current.

14. The method as claimed in claim 13, wherein said semiconductor laser has a nominal frequency of approximately 196 THz.

15. The method as claimed in claim 3, wherein said recognizing comprises comparing both a relative spacing of frequency values and relative amplitudes of said known transmission features with a relative spacing and relative amplitudes of said determined values, respectively.

16. The method as claimed in claim 4, wherein both a relative spacing of frequency values and relative amplitudes of said known transmission features are compared with a relative spacing and relative amplitudes of said determined values, respectively.

17. The method as claimed in claim 16, wherein said comparing includes determining a relative offset and scale factor.

18. A method as defined in claim 17, a non-linear two variable discrete correlation algorithm is used to obtain a best match for said relative offset and scale factor.

19. The method as claimed in claim 1, wherein said light intensity is measured using a semiconductor photodetector.

20. The method as claimed in claim 7, wherein said unknown optical source has a variable frequency, further comprising a step of using said computed frequency of said unknown source to establish a feedback loop which keeps the frequency of the unknown source at a predetermined frequency.

21. The method as claimed in claim 2, further comprising steps of:
(f) passing at least a part of said light through a filter means having a transmission feature substantially at said predetermined operating frequency;
(g) detecting an intensity of said light from said filter means to generate a feedback intensity signal; and
(h) adjusting said frequency control signal value in response to said feedback intensity signal to lock said source on said transmission feature.

22. A method of performing the frequency calibration of a variable frequency optical source to operate at a predetermined operating frequency, said source producing light at an optical frequency within a range of frequencies in response to a frequency control signal, comprising the steps of:
(a) scanning said frequency control signal through a range of values to cause said variable frequency optical source to emit light through at least a part of said range of frequencies;
(b) passing at least a part of the light generated by said variable frequency optical source through an optical filter means having a plurality of known frequency dependent transmission features at fixed optical frequencies within said part of said range of frequencies;
(c) measuring an intensity of the light transmitted through said filter means to determine at least two reference values of said frequency control signal responsible for generating optical frequencies from said source corresponding to said plurality of known transmission features at fixed optical frequencies; and
(d) calculating from at least two said reference values a frequency calibration function for obtaining a value of said frequency control signal as a function of desired output optical frequency of said light source.

23. The method as claimed in claim 1, wherein said assessing comprises at least one of:
i) evaluating said measured intensity of light transmitted through said filter means for said plurality of transmission features at said fixed optical frequencies to unambiguously identify by comparing relative values of said measured intensity with known relative absorption characteristics of said plurality of transmission features;
ii) evaluating a relative spacing of at least three said reference values to unambiguously identify said plurality of transmission features by comparison with a known relative spacing of said plurality of transmission features; and
iii) calculating from at least two said reference values a frequency calibration function for obtaining a value of said frequency control signal as a function of desired output optical frequency of said optical source.

* * * * *